United States Patent
Medrano López et al.

(10) Patent No.: US 12,199,687 B2
(45) Date of Patent: Jan. 14, 2025

(54) METHOD FOR ADAPTING A COMMUNICATION CHANNEL FOR URLLC SERVICES

(71) Applicant: TOP OPTIMIZED TECHNOLOGIES, SL, Madrid (ES)

(72) Inventors: Álvaro Medrano López, Madrid (ES); Miguel Blanco Carmona, Madrid (ES); Lucía Rey Fernández, Madrid (ES)

(73) Assignee: TOP OPTIMIZED TECHNOLOGIES, SL, Madrid (ES)

( * ) Notice: Subject to any disclaimer, the term of this patent is extended or adjusted under 35 U.S.C. 154(b) by 43 days.

(21) Appl. No.: 18/043,016

(22) PCT Filed: Aug. 24, 2021

(86) PCT No.: PCT/ES2021/070621
§ 371 (c)(1),
(2) Date: Feb. 24, 2023

(87) PCT Pub. No.: WO2022/043596
PCT Pub. Date: Mar. 3, 2022

(65) Prior Publication Data
US 2023/0361893 A1 Nov. 9, 2023

(30) Foreign Application Priority Data
Aug. 24, 2020 (ES) ............... ES202030886

(51) Int. Cl.
*H04B 7/06* (2006.01)
*H04B 17/336* (2015.01)
(Continued)

(52) U.S. Cl.
CPC ......... *H04B 17/336* (2015.01); *H04B 7/0632* (2013.01); *H04L 1/0026* (2013.01); *H04L 1/203* (2013.01)

(58) Field of Classification Search
CPC ... H04B 1/00; H04B 1/10; H04B 1/38; H04B 7/06; H04B 7/0632; H04B 15/00;
(Continued)

(56) References Cited

U.S. PATENT DOCUMENTS 8,432,866 B1 * 4/2013 Tapaninen ............... H04L 1/20
370/252
2012/0039207 A1 2/2012 Eriksson et al.

FOREIGN PATENT DOCUMENTS

EP 2529589 B1 8/2017

OTHER PUBLICATIONS

International Search Report, mailing date Feb. 8, 2022 for corresponding International Application No. PCT/ES2021/070621 with English translation (5 pages).
(Continued)

*Primary Examiner* — Shawkat M Ali
(74) *Attorney, Agent, or Firm* — Intellectual Property Law Group LLP (57) ABSTRACT

The present invention relates to a communications channel adaptation method for URLLC services which is configured for ensuring reliability when implementing said URLLC services and executed in a communications system with at least one transmitter node (eNode) and a receiver or mobile terminal, wherein the receiver or mobile terminal measures the desired signal-to-interference ratio (SIR) from the reference signal received in instant t=i−1 and saves this SIR value ($SIR_{i-1}$) in a memory; wherein based on this SIR value in instant t=i−1 ($SIR_{i-1}$), a CQI value ($CQI_{i-1}$) is determined and sent to the transmitter node (eNode), which selects the modulation and coding format in the subsequent transmission ($MCS_i$) in the downlink according to that CQI measured in instant t=i-1 ($CQI_{i-1}$); and wherein upon receiving in instant t=i the data packet sent by the transmitter node
(Continued)

(eNode), the receiver terminal measures the SIR ($SIR_i$) and saves it in a memory.

20 Claims, 5 Drawing Sheets

(51) Int. Cl.
*H04L 1/00* (2006.01)
*H04L 1/20* (2006.01)

(58) Field of Classification Search
CPC ......... H04B 17/00; H04B 17/336; H04L 1/00; H04L 1/20; H04L 1/203; H04L 1/0026; H04L 5/00; H04L 12/28; H04L 25/02; H04W 4/00; H04W 24/00; H04W 24/10; H04W 28/16; H04W 36/20; H04W 72/08; H04W 72/12; H04W 72/085

USPC ........ 370/252, 329, 330; 375/219, 227, 259, 375/260, 267, 285, 295, 316; 455/67.11, 455/69, 70, 283, 453, 522
See application file for complete search history.

(56) References Cited

OTHER PUBLICATIONS

Written Opinion of the ISA, mailing date Feb. 8, 2022 for corresponding International Application No. PCT/ES2021/070621 (9 pages).
Andrey Belogaev et al., "Conservative Link Adaptation for Ultra Reliable Low Latency Communications", 2019 IEEE International Black Sea Conference on Communications and Networking (Blackseacom), IEEE, Jun. 3, 2019, pp. 1-5, (total 5 pages).
Fujitsu, "Scheduling and CQI feedback for URLLC", vol. RAN WG1, No. Lisbon, Portugal; Oct. 10, 2016-Oct. 14, 2016, 3GPP Draft; R1-1608815 Scheduling and CQI Feedback Final, 3rd Generation Partnership Project (3GPP), Mobile Competence Centre, Oct. 9, 2016 (total 5 pages).
Renato B. Abreu et al., "Scheduling Enhancements and Performance Evaluation of Downlink 5G Time-Sensitive Communications" IEEE Access, IEEE, USA, vol. 8, Jul. 10, 2020, pp. 128106-128115, (total 10 pages).
Ericsson, "CQI reporting for URLLC", vol. RAN WG1, No. Prague, CZ; Oct. 9, 2016-Oct. 13, 2017, 3GPP Draft; R1-1718748, CQI Reporting for URLLC, 3rd Generation Partnership Project (3GPP), Mobile Competence Centre, Oct. 3, 2017 (total 4 pages).
Pocovi, G., Shariatmadari, H., Berardinelli, G., Pedersen, K., Steiner, J., & Li, Z. (2018). "Achieving ultra-reliable low-latency communications: Challenges and envisioned system enhancements". IEEE Network, 32(2), 8-15 (8 pages).
Michiharu Nakamura, Yassin Awad, and Sunil Vadgama (2002). "Adaptive Control of Link Adaptation for High Speed Downlink Packet Access (HSDPA) in W-CDMA". Fujitsu Laboratories of Europe Ltd. IEEE Transactions on Communications, pp. 382-386 (5 pages).

* cited by examiner

METHOD FOR ADAPTING A COMMUNICATION CHANNEL FOR URLLC SERVICES

CROSS-REFERENCE TO RELATED APPLICATIONS

This application is a U.S. National Phase application, under 35 U.S.C. § 371, of International Application no. PCT/ES2021/070621 with an international filing date of Aug. 24, 2021, and claims benefit of Spanish Application no. P202030886 filed on Aug. 24, 2020, each of which is hereby incorporated by reference in its entirety for all purposes.

FIELD OF THE INVENTION

The present invention relates to 5G mobile communications networks and more specifically to data services with high latency and reliability requirements. More specifically, the present invention relates to a method of adaptation to the communication channel for URLLC, i.e., Ultra-Reliable Low-Latency Communications, services.

BACKGROUND

The new generation of mobile networks represents a technological challenge for adapting 4G networks to the speed, latency, and reliability needs required by new 5G services. Data services with high latency and reliability requirements, also known as URLLC technologies, can be cited among the cases involving the use of next-generation networks. The organization in charge of standardizing new 5G network technologies is 3GPP (3$^{rd}$ Generation Partnership Project), which has taken the current 4G standard as a basis for defining the new 5G architecture. In that sense, for example, OFDM (Orthogonal Frequency-Division Multiplexing) modulations are still being used in 5G in the same way they were used in LTE (Long Term Evolution), which is the radio transmission used by 4G networks.

The new 5G specification defines the feedback of the channel state with the same concepts and nomenclature as in 4G technology. The mobile terminal reports the state of the communication channel, known as Channel State Information (CSI), to the communication node so that it can estimate the quality of the link and perform resource planning in the subsequent transmission to the terminal in the downlink. This definition is described in 3GPP's document TS.38.214, and as part of said report on the channel state, the mobile terminal determines an indicator of the quality of the communications channel known as Channel Quality Indicator (CQI).

The precision of the calculation of the state of the radio channel is a key factor for transitioning from wireless communications networks to data services with high latency and reliability requirements (URLLC). New 5G networks are being standardized to achieve latencies of about 1 ms with probabilities of error of $10^{-5}$, i.e., a probability of success of 99.999%, whereas for the standard in 4G technology, the probabilities of success used were 90% with latencies of about 100 ms.

Generally, a mobile terminal estimates the desired signal-to-interference ratio (SIR) by means of measuring the reference signal sent by the node (eNode) in the downlink. This reference signal is a cell specific reference signal (CRS) and allows the mobile receiver to perform channel estimation to demodulate the data, facilitate mobility, and for channel state measurements. This reference signal has a time-frequency grid structure (symbols-sub-carriers) depending on the number of antenna ports, wherein the reference signals are located along the grid.

Based on the SIR measured in the reference signals, the mobile terminal calculates the channel state or the CQI and reports it to the base station or eNode, so that the eNode scheduler can select, considering said CQI, the subsequent data transmission format that will be sent in the downlink, i.e., the modulation and coding (Modulation and Coding Scheme, MCS). This method is commonly known as link adaptation (LA). This reported CQI allows the conditions of the communications channel to be estimated and transmission to be set to the desired error rate (BLER or BLEP). Therefore, the precise determination of the CQI is a determining factor in the final performance of the communications system.

The correspondence between the channel quality indicator (CQI) and the modulation and coding format is described in detail in section 5.2.2 of 3GPP's specification TS.38.214. According to said specification, the CQI selected by the mobile terminal will be the highest possible CQI which causes the block error rate (BLER) of the communication to be below the target. The 3GPP defines two possible target BLER values, i.e., 10% and 0.001%, the latter being specifically defined for URLLC services.

To determine said correspondence, decision thresholds are defined based on the SIR values calculated by the mobile terminal from the reference signals. These decision thresholds which are applied to the received SIR for determining the CQI are calculated by imposing a target BLER of 10% or 0.001% on the BLER-SIR ratio curves.

The problem of this methodology of applying thresholds to the measured SIR for obtaining the CQI is that it involves the assumption that the SIR measurement is deterministic and that the thresholds satisfying the target BLER are constant over time. However, the premise of a deterministic SIR is not real due to the stochastic nature of the wireless communications channel, in which the radio electric signal experiences phenomena such as time and/or frequency variations. Furthermore, the speed of the mobile terminal changes over time. Therefore, precisely determining the channel quality that will be obtained at every moment for a specific CQI reported by the receiver is a complicated task.

Moreover, over the course of time from when the mobile terminal measures and determines the state of the communications channel defined by the CQI to when the eNode receives the CQI reported by the mobile terminal and performs a new planning and transmission in the downlink, the state of the communications channel has changed, and therefore the CQI calculated by the mobile becomes outdated. This imperfection is referred to as outdated CQI [1].

For those services using a target BLER of 10%, In the state of the art can be found several solutions which solve these problems by moving the thresholds applied on the measured SIR to determine the CQI by means of an algorithm that takes into account whether the data were received with an error or correctly [2]. Therefore, if the datum was received correctly, the thresholds dropped by an amount predefined by a step-down ($S_{down}$) and if it was received with an error the thresholds increased by another amount defined as step-up ($S_{up}$). To satisfy a specific target BLER, the step-up and step-down must be linked by the following equation:

$$\frac{S_{down}}{S_{up}} = \frac{\text{target } BLER}{1 - \text{target } BLER}$$

However, it should be noted that when the target BLER is very low, such as the case of 0.001% defined in the URLLC services, the step-down must be smaller than the step-up by 10,000. This means that this algorithm would be very slow in responding to changes, which renders it useless for services of this type.

Some methods for improving precision in the calculation of the CQI for both 4G technology and 5G technology are described in the state of the art. In that sense, for example, US2012/0039207A1 describes how CQI is used for controlling one or more aspects of wireless transmission, is compensated according to an aging function which depends on channel variability. More specifically, it proposes a method for calculating aged channel quality estimates for use in controlling transmissions on a wireless communication link, said method comprising: (a) estimating a variability in channel quality for the wireless communication link; and (b) calculating the aged channel quality estimates corresponding to the channel quality estimates determined for the wireless communication link by adjusting the value of each channel quality estimate by an amount that depends on the age of the channel quality estimate and on the variability in channel quality estimated for the wireless communication link.

In other words, US20120039207A1 proposes calculating the channel variability for each mobile by means of the prior calculation of the correlation or autocorrelation between different time instants of the channel, and based on this variability, an "aged" CQI is determined by means of a linear transformation, applying a "back-off" to the calculated CQI which will be greater the higher the variability of the channel. This document does not specify how the correlation or autocorrelation between two-time instants is calculated, simply mentioning a CQI processor which calculates the variability, saving the CQIs, and looking up the correlation between different time instants. The concept behind document US20120039207A1 is to calculate two channel quality reports in two-time instants and calculate the deviation between them. The historical CQIs are saved to be used in the decision function of the new corrected CQI, as well as to also measure same in different sub-bands to consider frequency variation.

Moreover, to minimize the impact of outdated CQI, there can be found in the state of the art the proposal described in EP2529589B1 which proposes a channel prediction model for including information about outdated CQI values in the planning algorithm of the transmitter. More specifically, the method described in this document comprises: (a) obtaining at least two channel quality reports for different time instances, each channel quality report comprising channel quality indications of at least two of the plurality of sub-bands; (b) estimating a channel quality deviation for at least one of the plurality of sub-bands based on the channel quality indicated in at least two of the most recently obtained channel quality reports and based on the obtained channel quality indications of at least two sub-bands; and (c) determining a channel quality indication for at least one of the plurality of sub-bands based on the estimated channel quality deviation for at least one of the plurality of sub-bands.

In other words, EP2529589B1 describes that the probability distribution function (PDF) of CQI values conditioned to the outdated CQI will be used for evaluating the BLER that is being obtained in the transmission and for enabling the feedback of this result in subsequent planning, such that the difference between what is planned and what is real is considered. This document analyzes the improvement proposed in planning for several mobile terminal speeds.

The problem of the methodology set forth in the preceding documents is that it has the final purpose of maximizing the effective transfer (throughput) rate of the communication system, but it does not ensure that the final reliability is better than the reliability achieved with the solutions described in the state of the art. In this sense, reliability in the new URLLC services is related not to achieving a high average transfer rate, but rather to always ensuring a minimal transfer rate. Therefore, a method providing a solution to the lack of reliability is still needed for new URLLC services.

In terms of other lines for the improvement of the CQI estimate, the strict requirements of the new URLLC services in terms of latency and reliability are explained in [1] and three improvements are proposed for measuring and reporting CQI in the downlink. The first improvement is based on estimating the CQI for different target error rates or target BLERs by means of applying different decision thresholds on SINR values. The second improvement is to enable configuring the target BLER according to the duration of the transmission interval time (TTI) and the transmission time of the Hybrid Automatic Repeat Request or HARQ (RTT). Finally, the third proposal seeks to reduce the impact of the CQI mismatch due to changes in the communications channel by means of mapping the SINR onto CQI based on the selection of the worst case of measurements collected from the channel (m-worst mapping), such that constant compliance with the target BLER is ensured.

From the proposals described in [1], the most interesting one is the third proposal because it seeks to improve the CQI mismatch, i.e., to improve the outdated CQI. The problem of the proposal described in [1] is that channel resources are not optimized because while it is true that the sporadic BLER will always be the same or better than the target, the described method chooses the smallest and most restrictive CQI of all possible CQIs in each band without performing a finer adjustment in each case.

SUMMARY OF THE INVENTION

An object of the present invention relates to a communications channel adaptation method and apparatus which ensures certain reliability in URLLC services. This object is achieved with the method of claim 1 and/or with the system of claim 7 and/or the software product of claim 13. The dependent claims describe preferred and/or embodiments of the present invention.

Indeed, the technical problem solved by the device and method object of the present invention relates to ensuring reliability according to an index proposed by the present invention. Said reliability must not be confused with the concept of effective transfer or throughput rate defined as a "net" rate, i.e., once errors have been excluded. Unlike in other solutions of the state of the art, the object of the invention is not to assure an effective transfer rate directly, rather, an object of the present invention is to provide the maximum speed which the conditions would allow for each mobile terminal, by means of satisfying the reliability index.

The concept of reliability index is introduced because, as described in the state of the art, threshold adaptation mechanisms do not work when the target BLER is very low (0.001%) like in URLLC services. However, the reliability index, as will be defined below, allows using calculated thresholds to satisfy said BLER of 0.001% and at the same allows these thresholds to be adapted to the conditions of each mobile using said index which can be high (in the order of 90%, or in other words, a non-compliance of 10%), which allows a quick adaptation. In other words, the problem preventing the adaption of thresholds, or generally the selection of transport format, to user conditions is solved in a quick and efficient manner.

Although the method of the invention is not limited to a specific type of mobile technology, the present invention will preferably be applied in 5G technology, which takes 4G or LTE technology as a basis. Therefore, the methodology of the invention is equivalently applicable to other radio technologies by means of the adaptation of the terminology.

As a result of the present invention, the lack of precision in CQI estimate can be mitigated by means of a method which ensures a minimum rate of success of the service, such that the data in a first transmission reach the receiver complying with the target error rate of the service and not requiring successive retransmissions which entail worse fixed latency targets.

The scope of the present invention is defined by the claims which are incorporated in this section by reference. Throughout the description and the claims, the word "comprises" and variants thereof do not seek to exclude other technical features, components, or steps. For those skilled in the art, other objects, advantages, and features of the invention will be inferred in part from the description and in part from the practice of the invention. The following usage examples and associated figures are provided in an illustrative and non-limiting manner. Furthermore, the present invention covers all the possible combinations of particular and preferred embodiments herein indicated.

BRIEF DESCRIPTION OF THE DRAWINGS

A series of drawings and diagrams which help to better understand the invention and are expressly related with an embodiment of said invention, presented as a non-limiting example thereof, is described very briefly below.

DETAILED DESCRIPTION OF SPECIFIC EMBODIMENTS

Figure 1:
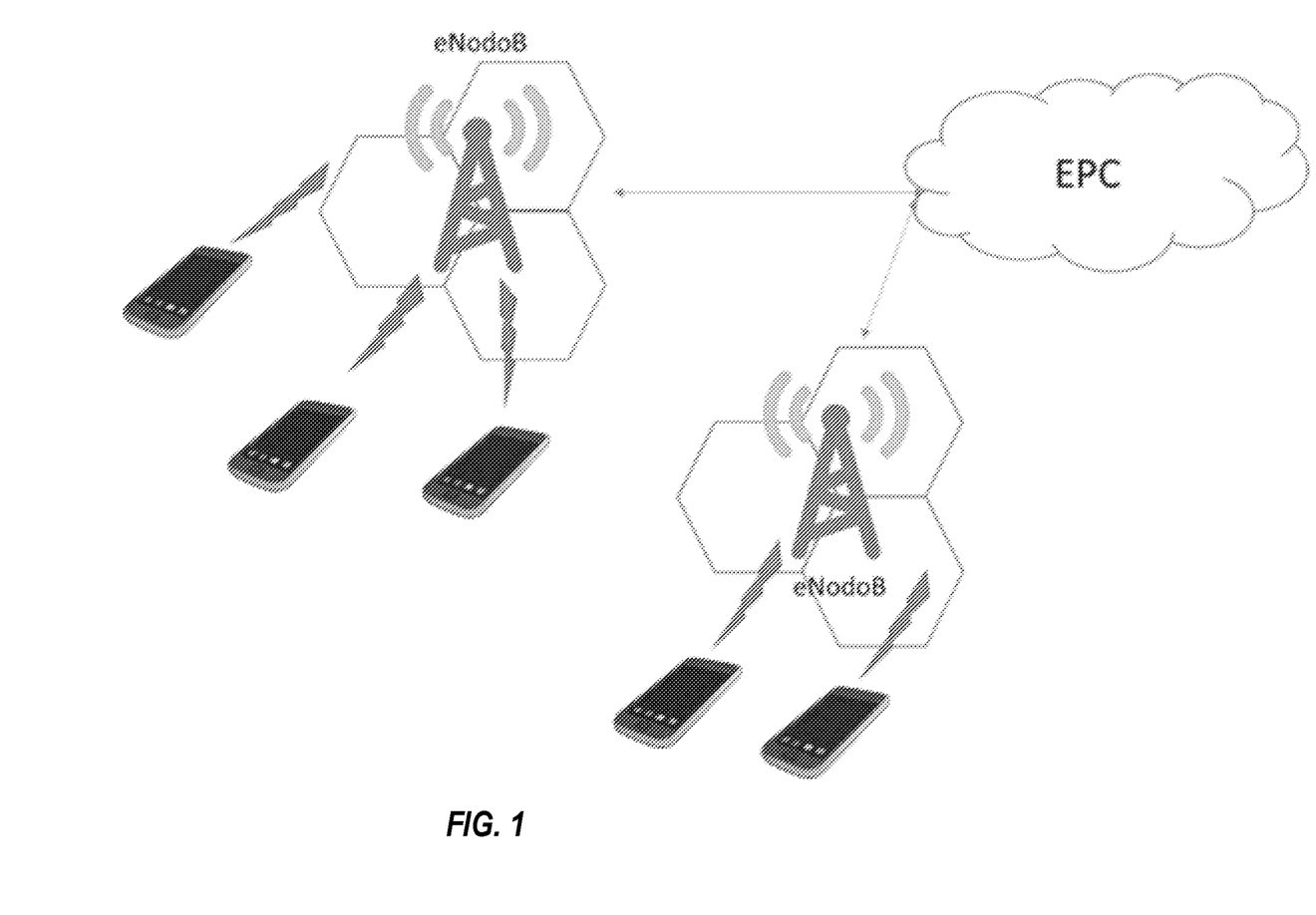
FIG. 1 shows a next generation (5G) network structure.

FIG. 1, for example, shows a diagram of the structure of a next generation (5G) mobile communications network as described in the state of the art. Said structure includes therein, at one communication end, user mobile terminals to which voice and data service is provided, and at the other end, the communications network the first access point of which are base stations or communications nodes, referred to as eNode in 4G and 5G nomenclatures. The network is made up of multiple base stations or eNodes (hereinafter, base stations or eNodes will be referred to as "nodes" to simplify the notation), each of which provides service to a group of mobile terminals located within a coverage area. This coverage area of each node is in turn subdivided into different coverage cells, which provide 360° coverage of an area around the node and have their own radio resources. These cells are depicted as hexagons in FIG. 1.

Figure 2:
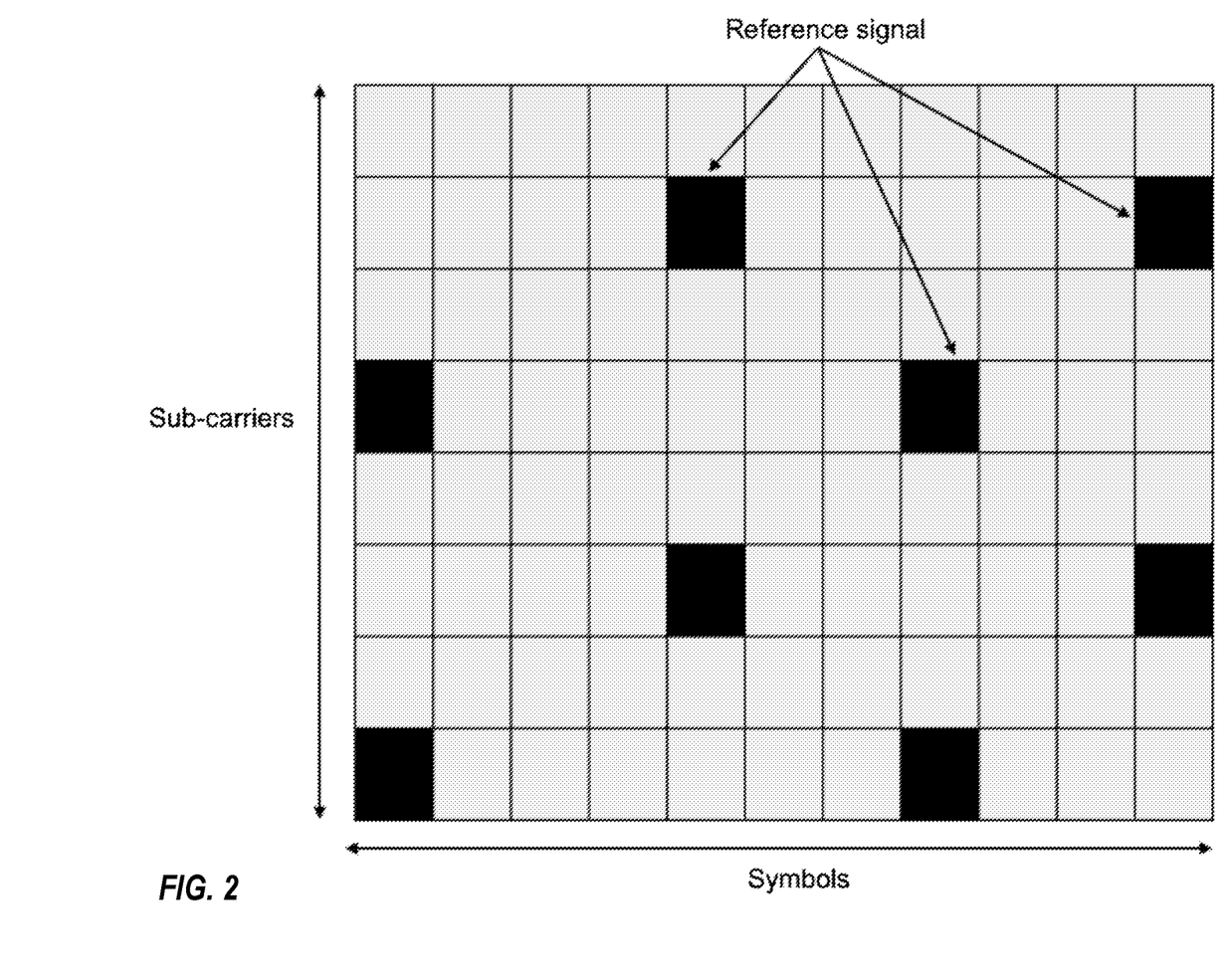
FIG. 2 shows a time-frequency grid with signal planning.

In FIG. 2, reference signals on a time-frequency grid typical of resource planning in LTE are depicted in black. For the different transmissions, the data and control information is multiplexed in time and frequency using this grid, which has a time dimension of 1 ms and a frequency dimension of 180 KHz. These reference signals are then used by the receiver to determine link quality.

Figure 3:
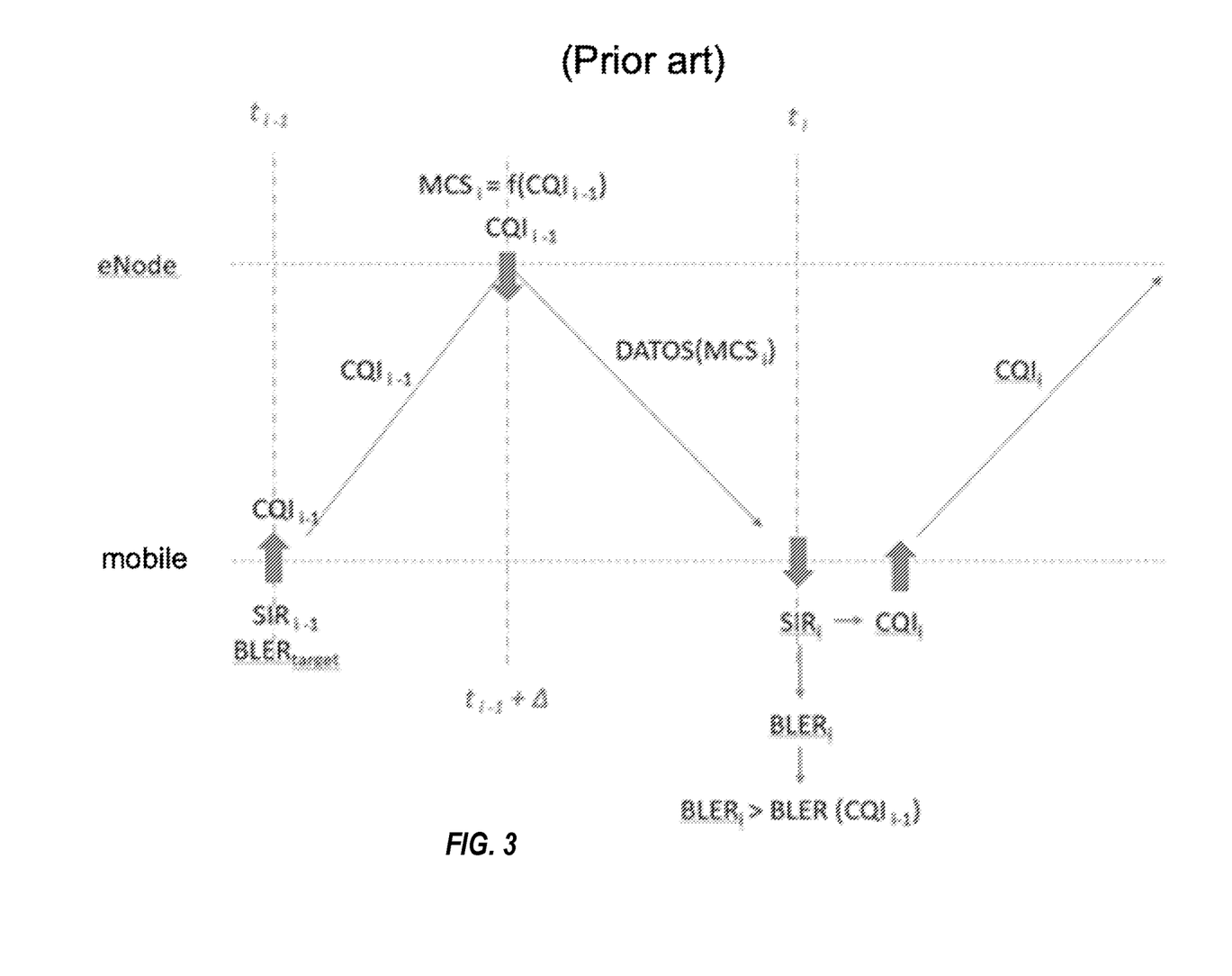
FIG. 3 shows a diagram of the operation of the methods of the state of the art.

FIG. 3 graphically shows the state of the art prior to the present invention in terms of the methodology of determining the CQI and the associated problems of the CQI not being updated to the actual link quality at the moment in which the transmitter receives the feedback from the receiver and perform a new data planning. In that sense:

In instant $t=i-1$, the mobile terminal (receiver) receives a reference signal according to the pattern shown in FIG. 2 and uses it to estimate the desired signal-to-interference ratio ($SIR_{i-1}$). By applying the threshold algorithm, the receiver determines the $CQI_{i-1}$ value from the measured SIR and sends it to the node (eNode or transmitter).

In instant $t=i-1+\Delta$, the transmitter receives the $CQI_{i-1}$ value reported by the mobile terminal and determines the modulation and coding format (MCS) of the data to be transmitted in the downlink corresponding to the received CQI, i.e., $MCS_i=f(CQI_{i-1})$. Again, the node codes the data to be transmitted ($DATA(MCS_i)$) according to the determined format and sends it to the mobile terminal (receiver).

In instant $t=i$, the mobile terminal receives the data, accompanied by the reference signals sent by the transmitter according to the $CQI_{i-1}$, calculates the level of SIR, and demodulates the received data. In parallel, communication quality is measured in terms of BLER based on the received signal. Lastly, FIG. 3 depicts how the mobile terminal (receiver) determines channel quality from the measured SIR and determines the $CQI_i$ to be sent to the node (transmitter) for subsequent transmission.

Figure 4:
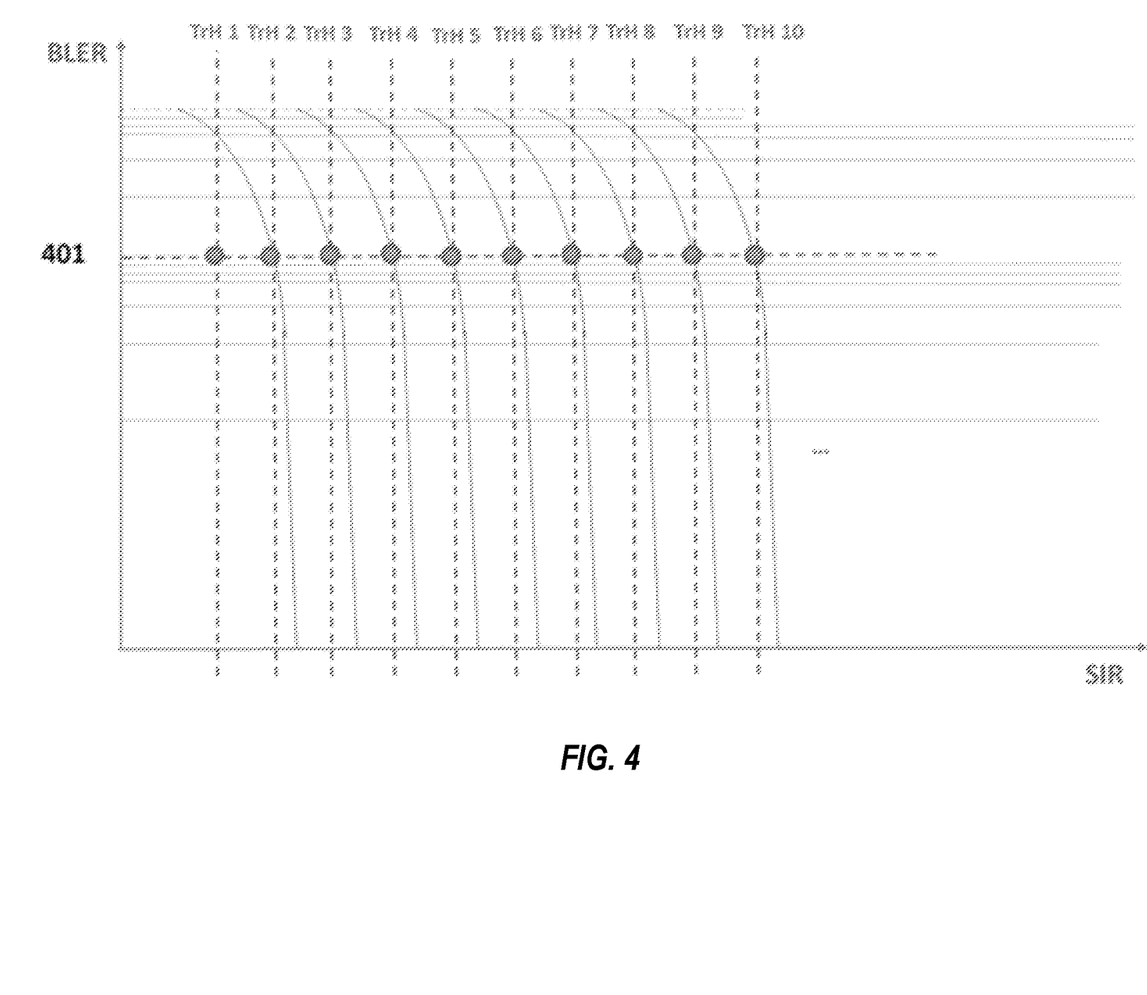
FIG. 4 shows a diagram of the determination of CQI thresholds.

FIG. 4 depicts the methodology for determining the thresholds that will be applied to the SIR by the mobile terminal. The mobile terminal uses, internally, a threshold algorithm based on these curves to enable determining the CQI sent to the transmitter node for subsequent planning in the downlink. The target communication quality (target BLER) is depicted in the figure by means of the horizontal line 401 and usually takes the value of 10% or 0.001%. The CQI must be determined such that it ensures that the error rate is less than the target rate for the SIR measured by the receiver or mobile terminal. Therefore, the thresholds are defined as the cut-off point of the SIR-BLER curves for different CQIs with the horizontal line of the target BLER, and the threshold SIR values are obtained from those correspondences.

Figure 5:
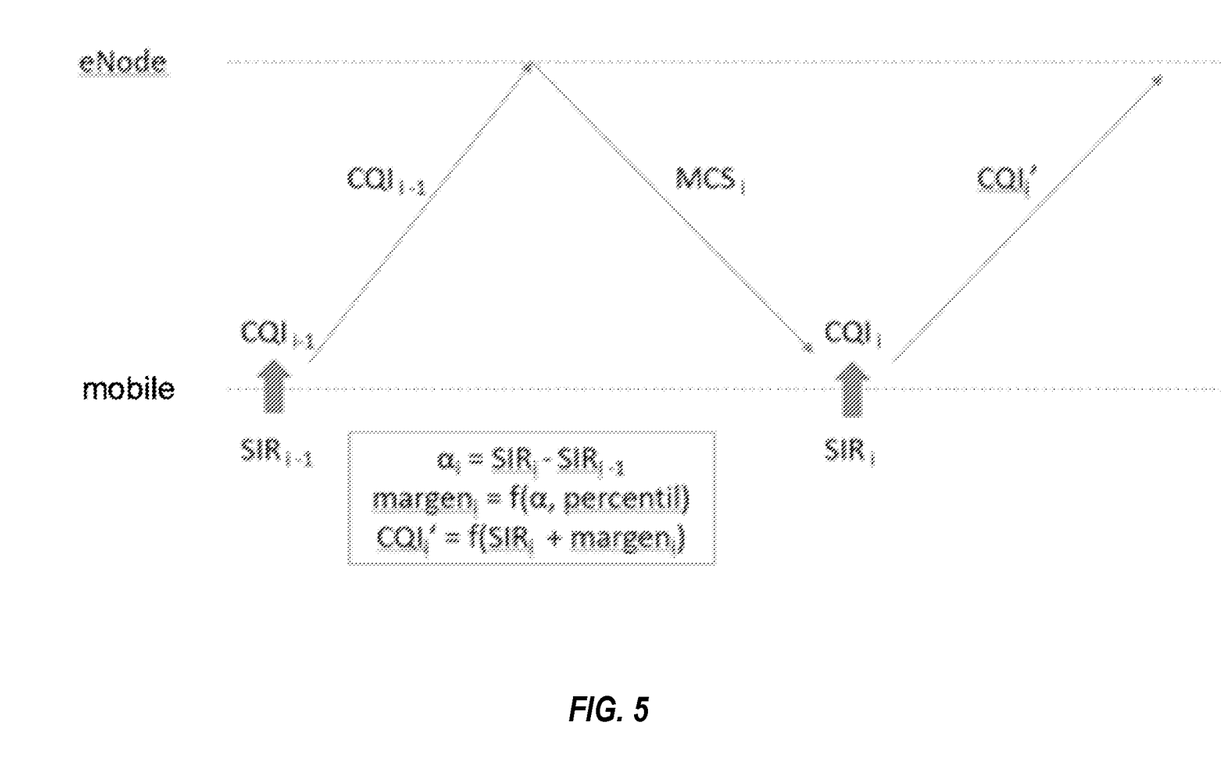
FIG. 5 shows a diagram of the operation of the method of the invention.

FIG. 5 depicts a diagram of the operation of the preferred embodiment of the method object of the present invention. To that end, an example of communication between a mobile terminal and a node (eNode), i.e., between the receiver and the transmitter of a communication, depicted as two ends thereof, and the information exchange between them, are shown.

The method object of the invention is included within a wireless communications system like the one shown in FIG. 1, wherein the receiver or mobile terminal measures the desired signal-to-interference ratio (SIR) from the reference signal received in instant $t=i-1$ and saves this SIR value ($SIR_{i-1}$) in a memory. Based on this SIR value ($SIR_{i-1}$), a CQI value ($CQI_{i-1}$) is determined and sent to the transmitter node, which selects the modulation and coding format in the subsequent transmission (MCSi) in the downlink according to that measured CQI ($CQI_{i-1}$). Upon receiving in instant "t" the data packet sent by the transmitter node, the receiver terminal measures the SIR ($SIR_i$) and saves it in a memory.

The present invention proposes for the receiver or mobile terminal to calculate, based on the comparison between the measurements taken coming from the transmitter node in different time instants, a parameter ($\alpha_i$) which allows the variation experienced by the communications channel between said transmissions to be determined. The variation quantification parameter of the communications channel ($\alpha_i$) therefore precisely reflects the difference existing between the channel quality taking as a reference the instant in which the CQI is determined by means of the reference signals ($CQI_{i-1}$) and the instant in which the receiver mobile terminal receives the data corresponding to that $CQI_{i-1}$ in the subsequent reception and measures the channel quality again ($CQI_i$).

In a preferred embodiment of the invention, the variation quantification parameter of the communications channel ($\alpha_i$) is defined as the difference between the SIR values measured by the receiver mobile terminal for quantifying the variation experienced in the communications channel. In other words:

$$\alpha_i = SIR_i - SIR_{i-1}$$

Nevertheless, the variation quantification parameter of the communications channel (a) can be defined alternatively with other time variations or differences since, unlike other approaches described in the state of the art, the present invention does not have frequency variation or discrimination. A possible formation of the variation quantification parameter of the communications channel (a) would be performed by means of calculating the variation of the CQI value, such that:

$$\alpha_i = CQI_i - CQI_{i-1}$$

One skilled in the art will appreciate that other variations of this definition can also be valid for the purposes of this invention, such as differences between average or weighted values of SIR or CQI measurements in different frequency bands, or the use of values corresponding to more than two time instants with coefficients weighing same in the event that there is an uncertainty concerning which measuring instant i–1 is the one that brings about the determination of the data received in i.

A second essential point of the present invention is the calculation of a correction margin by means of a transformation function the two input parameters of which are the variation quantification parameter of the communications channel ($\alpha_i$) and, on the other hand, the target reliability to be fixed for the communication of the offered services. In that sense:

$$margin_i = f(\alpha_i, \text{target reliability})$$

Target reliability is the value to be ensured with the present invention for a reliability index which can be defined according to the following equation:

$$\text{Reliability index} = \frac{\text{number of slots } (BLER_i < BLER_{target})}{\text{total number of slots}}$$

where $BLERi_i$ is the real instantaneous block error rate and $BLER_{target}$ is the target mean block error rate of the service.

In the present invention, there is a need to resort to defining the concept of reliability index in order to complement the concept of target mean block error rate ($BLER_{target}$) of the 5G service because, as mentioned above, although the $BLER_{target}$ is complied with on average, it is occasionally not complied with for all the transmissions due to imprecision in the determination of the CQI, and therefore this causes the occasional failure to satisfy the final latency of the system for all the cases. The present invention proposes ensuring that said reliability index is greater than a certain target reliability for the service by means of applying a correction margin to the calculation of the CQI performed by the mobile terminal before reporting the CQI to the transmitter node.

As indicated above, a correction to the calculation of the CQI based directly on received block errors is not effective due to such a low target error rate used in URLLC services. However, indirect correction through the reliability index which has been defined allows using higher reliability, allowing an effective correction that is compatible with the use of very low target block error rates.

If the reliability index is defined as the percentage of blocks or time that must satisfy the maximum BLER established for the services used, the present invention will have the effect that, once the channel state has been modified and therefore the CQI has been sent to the transmitter, the final block error rate of the system will be the target rate (10% in the case of LTE or less in URLLC services) in a percentage of time determined by the fixed target reliability.

The reliability index is measured indirectly because the real instantaneous block error rate cannot be measured directly. However, as described in FIG. 4, there is a direct relationship between the error rate and the received SIR or the estimated CQI. The embodiments that will be described below assume that if the conditions when receiving the data (for example, SIR or CQI) are worse than those under which the transport format, with which data was transmitted, was determined, this means that the instantaneous block error rate will be higher than the target block error rate. In other words, the invention is since the defined variation quantification parameter of the communications channel ($\alpha_i$) can be used as a basis for calculating the reliability index which in turn allows the CQI to be corrected in order to adapt same to the conditions more quickly than with BLER.

A first embodiment for this step of calculating the correction margin is the calculation of same based on the distribution function of the variation quantification parameter of the communications channel ($\alpha_i$). The concept of reliability index, as defined above, is equivalent in statistical terms to that cut-off percentile or probability. Specifically, to assure that the channel has a reliability index higher than a certain target reliability, a margin based on the percentile (100%–target reliability) of the distribution of $\alpha_i$ must be used.

According to this embodiment, the calculation of the correction margin based on the SIR or CQI would comprise the following steps:

Obtaining a plurality of values of the variation quantification parameter of the communications channel ($\alpha_i$).

Determining the n % percentile of the distribution, where n=100%–target reliability, and with the n % percentile being defined as that value below which n % of the plurality of obtained values is found.

Determining $margin_i$ based on said percentile:

$$margin_i = \text{percentile\_}\alpha_i(100\% - \text{target reliability})$$

Another possible embodiment for this second step of determining the correction margin consists of an algorithm which gradually approaches, in an iterative manner, the percentile value corresponding to the target reliability described in the preceding embodiment. Specifically, in this embodiment the percentile estimate value is updated with each new value of $\alpha_i$ calculated by the mobile, increasing or decreasing the value thereof by means of a step-up ($S_{up}$) or a step-down ($S_{down}$), respectively. The target reliability defines the ratio between both steps, which must satisfy the following expression:

$$\frac{S_{up}}{S_{up}+S_{down}} = \text{Target reliability}$$

The iterative process for updating $margin_i$ is performed according to the following method:

If $\alpha_i > margin_{i-1}$, then $margin_i = margin_{i-1} - S_{down}$;
If $\alpha_i < margin_{i-1}$, then $margin_i = margin_{i-1} + S_{up}$.

This method is advantageous compared to the preceding one because it does not require storing old $\alpha_i$ values, whereby the use of memory is reduced.

Following the methodology proposed in the present invention, an adjustment is successfully performed on the CQI reported to the transmitter to eliminate the effect of the change of channel conditions from when the receiver calculates the CQI to the moment in which the transmitter will perform data planning in the downlink. The described method applies a correction margin on the calculation of the CQI determined by channel variation; it is conceptually equivalent to modifying the decision thresholds in the SIR-CQI correspondence performed by the receiver when it measures the reference signal and reports same to the transmitter, making them more demanding. Setting a higher level of demand on decision thresholds would imply that a shift thereof to higher SIR values will take place, such that, for one and the same SIR, a CQI that is lower than the previous one will be obtained.

Example of Practical Embodiment of the Invention

As indicated above, a diagram of the operation of the preferred embodiment of the method object of the invention is depicted in FIG. 5. To that end, an extract of a communication between the mobile terminal and the node (eNode), i.e., between the receiver and the transmitter of a communication, represented as two ends thereof, and information exchange between them, are shown. In that sense, every time the mobile receiver receives data in the downlink, the downlink performs the following steps in instant i:

estimating the received desired signal-to-interference ratio ($SIR_i$); saving the $SIR_i$ value;
determining the SIR error value defined as the difference between the SIR of instant [i−1], $SIR_{i-1}$, and the SIR of the current instant [i], $SIR_i$, where $\alpha_i = SIR_i - SIR_{i-1}$; saving the $\alpha_i$ value;
calculating the correction margin by applying the desired reliability index on the statistics, where $margin_i = f(\alpha, \text{reliability})$;
correcting the SIR measured by the terminal in the current instant, $SIR_i$, by applying the correction margin, $margin_i$, before determining the CQI corresponding to that $SIR_i$, such that $SIR_i' = SIR_i + margin$; and determining the CQI corresponding to that received and corrected desired signal-to-interference ratio $SIR_i'$, $CQI_i$.

REFERENCES

[1] Pocovi, G., Shariatmadari, H., Berardinelli, G., Pedersen, K., Steiner, J., & Li, Z. (2018). "Achieving ultra-reliable low-latency communications: Challenges and envisioned system enhancements". IEEE Network, 32(2), 8-15.

[2] Michiharu Nakamura, Yassin Awad, and Sunil Vadgama (2002). "Adaptive Control of Link Adaptation for High Speed Downlink Packet Access (HSDPA) in W-CDMA". Fujitsu Laboratories of Europe Ltd. IEEE Transactions on Communications.

The invention claimed is:

1. A communications channel adaptation method for ultra-reliable low-latency communications (URLLC) services being executed in a communications system;
wherein the communications system comprises:
at least a transmitter node (eNode), and
a receiver or mobile terminal;
wherein the receiver or mobile terminal measures a desired signal-to-interference ratio (SIR) value from a reference signal received in an instant t=i−1, where t is a time and i is a positive integer and saves the SIR value ($SIR_{i-1}$) in a memory;
wherein based on the SIR value ($SIR_{i-1}$), a channel quality indicator CQI value ($CQI_{i-1}$) is determined and the CQI value ($CQI_{i-1}$) is sent to the eNode, and the eNode selects a modulation and coding scheme (MCS) in a subsequent transmission ($MCS_i$) in a downlink according to the CQI value ($CQI_{i-1}$);
wherein upon receiving in an instant t=i a data packet sent by the eNode, the receiver or mobile terminal measures a SIR value ($SIR_i$), and saves the SIR value ($SIR_i$) in the memory; and
wherein the method comprises the following steps:
calculating a variation quantification parameter of a communications channel ($\alpha_i$) defined as a difference existing between a channel quality taking as a reference an instant in which a CQI is determined by means of reference signals ($CQI_{i-1}$) and an instant in which the receiver or mobile terminal receives data corresponding to the $CQI_{i-1}$ in a subsequent reception and measures a channel quality again ($CQI_i$);
calculating a correction margin ($margin_i$) depending at least on a plurality of values of the variation quantification parameter of the communications channel ($\alpha_i$);
correcting the SIR value measured by the receiver or mobile terminal in instant t=i ($SIR_i$) by applying the calculated correction margin ($margin_i$) in a manner that the SIR value corrected in instant t=i ($SIR_i'$) is equal to a sum of the SIR value in instant t=i ($SIR_i$) plus the correction margin ($margin_i$); and
determining a CQI ($CQI_i'$) corresponding to the $SIR_i'$.

2. The method according to claim 1, wherein the variation quantification parameter of the communications channel ($\alpha_i$) is defined as a difference between SIR values measured by the receiver or mobile terminal for quantifying a variation experienced in the communications channel, in a manner that $\alpha_i = SIR_i - SIR_{i-1}$.

3. The method according to claim 2, wherein the method further comprises establishing a reliability index defined as:

$$\text{Reliability index} = \frac{\text{number of slots } (BLER_i < BLER_{target})}{\text{total number of slots}}$$

where $BLER_i$ is a real instantaneous block error rate and $BLER_{target}$ is a target mean block error rate of a URLLC service required by the receiver or mobile terminal; in a manner that the calculation of the correction margin (margin$_i$) is performed by means of a transformation function two input parameters of which are the variation quantification parameter of the communications channel ($\alpha_i$) and a target reliability which is established for the calculated reliability index.

4. A software product comprising a non-transitory computer readable storage medium stored with instructions, when executed by one or more processors, cause the one or more processors to carry out the communications channel adaptation method according to claim 2.

5. The method according to claim 1, wherein the variation quantification parameter of the communications channel ($\alpha_i$) is defined as a calculation of a variation of the CQI value, in a manner that $\alpha_i = CQI_i - CQI_{i-1}$.

6. The method according to claim 5, wherein the method further comprises establishing a reliability index defined as:

$$\text{Reliability index} = \frac{\text{number of slots } (BLER_i < BLER_{target})}{\text{total number of slots}}$$

where $BLER_i$ is a real instantaneous block error rate and $BLER_{target}$ is a target mean block error rate of a URLLC service required by the receiver or mobile terminal; in a manner that the calculation of the correction margin (margin$_i$) is performed by means of a transformation function two input parameters of which are the variation quantification parameter of the communications channel ($\alpha_i$) and a target reliability which is established for the calculated reliability index.

7. A software product comprising a non-transitory computer readable storage medium stored with instructions, when executed by one or more processors, cause the one or more processors to carry out the communications channel adaptation method according to claim 5.

8. The method according to claim 1, wherein the method further comprises establishing a reliability index defined as:

$$\text{Reliability index} = \frac{\text{number of slots } (BLER_i < BLER_{target})}{\text{total number of slots}}$$

where $BLER_i$ is a real instantaneous block error rate and $BLER_{target}$ is a target mean block error rate of a URLLC service required by the receiver or mobile terminal; in a manner that the calculation of the correction margin (margin$_i$) is performed by means of a transformation function two input parameters of which are the variation quantification parameter of the communications channel ($\alpha_i$) and a target reliability which is established for the calculated reliability index.

9. A software product comprising a non-transitory computer readable storage medium stored with instructions, when executed by one or more processors, cause the one or more processors to carry out the communications channel adaptation method according to claim 8.

10. The method according to claim 1, wherein the method further comprises:
obtaining the plurality of values of the variation quantification parameter of the communications channel ($\alpha_i$);
determining n % percentile of a distribution, where n=100%−target reliability, and with the n % percentile being defined as a value below which n % of the plurality of obtained values is found; and
determining the correction margin (margin$_i$) based on said percentile:

margin$_i$=percentile_$\propto_i$(100%−target reliability).

11. The method according to claim 1, wherein the correction margin (margin$_i$) is iteratively calculated to a percentile value corresponding to a target reliability, in a manner that a percentile estimate value is updated with each new value of the variation quantification parameter of the communications channel ($\alpha_i$) calculated by the receiver or mobile terminal, increasing or decreasing the percentile estimate value by means of a step-up ($S_{up}$) or a step-down ($S_{down}$), respectively, in a manner that the target reliability defines a ratio between the step-up ($S_{up}$) and the step-down ($S_{down}$), which must satisfy the following expression:

$$\frac{S_{up}}{S_{up} + S_{down}} = \text{Target reliability}$$

wherein the iterative process for updating margin$_i$ is performed according to the following condition:
If $\alpha_i > \text{margin}_{i-1}$, then $\text{margin}_i = \text{margin}_{i-1} - S_{down}$;
If $\alpha_i < \text{margin}_{i-1}$, then $\text{margin}_i = \text{margin}_{i-1} + S_{up}$.

12. A software product comprising a non-transitory computer readable storage medium stored with instructions, when executed by one or more processors, cause the one or more processors to carry out the communications channel adaptation method according to claim 1.

13. A communications system comprising:
at least a transmitter node (eNode); and
a receiver or mobile terminal;
wherein the receiver or mobile terminal is configured to measure a desired signal-to-interference ratio (SIR) value from a reference signal received in an instant t=i−1, where t is a time and i is a positive integer and save the SIR value ($SIR_{i-1}$) in a memory; and wherein the receiver or mobile terminal is further configured to determine a channel quality indicator (CQI) value ($CQI_{i-1}$) based on the SIR value ($SIR_{i-1}$) and send the CQI value ($CQI_{i-1}$) to the eNode;
wherein the eNode is configured to select a modulation and coding scheme (MCS) in a subsequent transmission ($MCS_i$) in a downlink according to the CQI value ($CQI_{i-1}$);
wherein upon receiving in an instant t=i a data packet sent by the eNode, the receiver or mobile terminal measures a SIR value ($SIR_i$) and saves the SIR value ($SIR_i$) in the memory; and
wherein the receiver or mobile terminal comprises at least one or more processors and one or more programs, wherein the one or more programs are stored in one or more memories and configured for being executed by means of the at least one or more processors, the one or more programs including instructions for:
calculating a variation quantification parameter of a communications channel ($\alpha_i$) defined as a difference existing between a channel quality taking as a reference an instant in which a CQI is determined by means of reference signals ($CQI_{i-1}$) and an instant in which the receiver or mobile terminal receives data corresponding to the $CQI_{i-1}$ in a subsequent reception and measures a channel quality again ($CQI_i$);

calculating a correction margin ($margin_i$) depending at least on a plurality of values of the variation quantification parameter of the communications channel ($\alpha_i$);

correcting the SIR value measured by the receiver or mobile terminal in instant t=i ($SIR_i$) by applying the calculated correction margin ($margin_i$) in a manner that the SIR value corrected in instant t=i ($SIR'_i$) is equal to a sum of the SIR value in instant t=i ($SIR_i$) plus the correction margin ($margin_i$); and determining a CQI ($CQI'_i$) corresponding to the $SIR'_i$.

14. The system according to claim 13, wherein the variation quantification parameter of the communications channel ($\alpha_i$) is defined as a difference between SIR values measured by the receiver or mobile terminal for quantifying a variation experienced in the communications channel, in a manner that $\alpha_i = SIR_i - SIR_{i-1}$.

15. The system according to claim 14, wherein the one or more programs comprise instructions for:

establishing a reliability index defined as:

$$\text{Reliability index} = \frac{\text{number of slots } (BLER_i < BLER_{target})}{\text{total number of slots}}$$

where $BLERi_i$ is a real instantaneous block error rate and $BLER_{target}$ is a target mean block error rate of an ultra-reliable low-latency communications (URLLC) service required by the receiver or mobile terminal; in a manner that the calculation of the correction margin ($margin_i$) is performed by means of a transformation function two input parameters of which are the variation quantification parameter of the communications channel ($\alpha_i$) and a target reliability which is established for the calculated reliability index.

16. The system according to claim 13, wherein the variation quantification parameter of the communications channel ($\alpha_i$) is defined as a calculation of a variation of the CQI value, in a manner that $\alpha_i = CQI_i - CQI_{i-1}$.

17. The system according to claim 16, wherein the one or more programs comprise instructions for:

establishing a reliability index defined as:

$$\text{Reliability index} = \frac{\text{number of slots } (BLER_i < BLER_{target})}{\text{total number of slots}}$$

where $BLERi_i$ is a real instantaneous block error rate and $BLER_{target}$ is a target mean block error rate of an ultra-reliable low-latency communications (URLLC) service required by the receiver or mobile terminal; in a manner that the calculation of the correction margin ($margin_i$) is performed by means of a transformation function two input parameters of which are the variation quantification parameter of the communications channel ($\alpha_i$) and a target reliability which is established for the calculated reliability index.

18. The system according to claim 13, wherein the one or more programs comprise instructions for:

establishing a reliability index defined as:

$$\text{Reliability index} = \frac{\text{number of slots } (BLER_i < BLER_{target})}{\text{total number of slots}}$$

where $BLERi_i$ is a real instantaneous block error rate and $BLER_{target}$ is a target mean block error rate of an ultra-reliable low-latency communications (URLLC) service required by the receiver or mobile terminal; in a manner that the calculation of the correction margin ($margin_i$) is performed by means of a transformation function two input parameters of which are the variation quantification parameter of the communications channel ($\alpha_i$) and a target reliability which is established for the calculated reliability index.

19. The system according to claim 13, wherein the one or more programs further comprise instructions for:

obtaining the plurality of values of the variation quantification parameter of the communications channel ($\alpha_i$);

determining n % percentile of a distribution, where n=100%−target reliability, and with the n % percentile being defined as a value below which n % of the plurality of obtained values is found; and determining the correction margin (margin) based on said percentile:

$$margin_i = \text{percentile}\_\alpha_i(100\% - \text{target reliability}).$$

20. The system according to claim 13, wherein the correction margin ($margin_i$) is iteratively calculated to a percentile value corresponding to a target reliability, in a manner that a percentile estimate value is updated with each new value of the variation quantification parameter of the communications channel ($\alpha_i$) calculated by the receiver or mobile terminal, increasing or decreasing the percentile estimate value thereof by means of a step-up ($S_{up}$) or a step-down ($S_{down}$), respectively, in a manner that the target reliability defines a ratio between the step-up ($S_{up}$) and the step-down ($S_{down}$), which must satisfy the following expression:

$$\frac{S_{up}}{S_{up} + S_{down}} = \text{Target reliability}$$

and wherein the iterative process for updating $margin_i$ is performed according to the following condition:

If $\alpha_i > margin_{i-1}$, then $margin_i = margin_{i-1} - S_{down}$;
If $\alpha_i < margin_{i-1}$, then $margin_i = margin_{i-1} + S_{up}$.

* * * * *